(12) United States Patent
Subbarao et al.

(10) Patent No.: US 11,212,211 B2
(45) Date of Patent: Dec. 28, 2021

(54) SYSTEMS AND METHODS FOR AUTOMATICALLY DETECTING ROUTING PEERS

(71) Applicant: Arista Networks, Inc., Santa Clara, CA (US)

(72) Inventors: Vivek Subbarao, Austin, TX (US); Josh Pfosi, Medford, MA (US); Prashanth Rajendran, Nashua, NH (US); Akshay Gattani, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/528,504

(22) Filed: Jul. 31, 2019

(65) Prior Publication Data
US 2021/0036947 A1   Feb. 4, 2021

(51) Int. Cl.
| | |
|---|---|
| *H04L 12/751* | (2013.01) |
| *H04L 12/66* | (2006.01) |
| *H04L 29/12* | (2006.01) |
| *H04L 12/715* | (2013.01) |

(52) U.S. Cl.
CPC .............. *H04L 45/02* (2013.01); *H04L 12/66* (2013.01); *H04L 45/04* (2013.01); *H04L 61/6059* (2013.01)

(58) Field of Classification Search
None
See application file for complete search history.

(56) References Cited

U.S. PATENT DOCUMENTS

| | | | | |
|---|---|---|---|---|
| 2015/0092785 | A1* | 4/2015 | Torvi | H04L 45/02 370/401 |
| 2017/0295503 | A1* | 10/2017 | Govindaraju | H04W 4/38 |
| 2017/0310589 | A1* | 10/2017 | Tambakuwala | H04L 61/25 |
| 2018/0101396 | A1* | 4/2018 | Singh | H04L 41/0806 |

OTHER PUBLICATIONS

Kato et al., "BGP4+ Peering Using IPv6 Link-local Address draft-kato-bgp-ipv6-link-local-00.txt," Internet Engineering Task Force, Internet-Draft, Sep. 20, 2001, Expires: Apr. 20, 2002, 7 pages.

(Continued)

*Primary Examiner* — Hong Shao
(74) *Attorney, Agent, or Firm* — Fountainhead Law Group P.C.

(57) ABSTRACT

Methods and systems are described for automatically detecting network routing peers and establishing route peering sessions. An illustrative method includes retrieving, at a network router, route peer configuration for the network router. The route peer configuration identifies one or more network interfaces for route peering but typically does not identify an address of peer routers. The method identifies, based on the route peer configuration, a network interface from a plurality of network interfaces of the network router for route peering and configures the network interface to participate in route peering. The method then detects a peer router on the network interface and initiates a peering session on the network interface with the peer router. Using the peering session, the method exchange route information with the peer router.

20 Claims, 4 Drawing Sheets

(56) References Cited

OTHER PUBLICATIONS

Narten et al., "Neighbor Discovery for IP version 6 (IPv6)," Network Working Group, Request for Comments: 4861, Obsoletes: 2461, Category: Standards Track, Sep. 2007, 97 pages.
"Understanding IPv6 Link Local Address," Cisco, Nov. 21, 2011, 11 pages. Retrieved Apr. 16, 2019 from https://www.cisco.com/c/en/us/support/docs/ip/ip-version-6-ipv6/113328-ipv6-lla.html.
"IPv6 Routing: Multiprotocol BGP Link-Local Address Peering," IP Routing: BGP Configuration Guide, Cisco IOS XE Release 3S, 6 pages (Nov. 30, 2012).

* cited by examiner

SYSTEMS AND METHODS FOR AUTOMATICALLY DETECTING ROUTING PEERS

BACKGROUND

The present disclosure is directed to automatically detecting network routing peers and establishing network route peering sessions.

SUMMARY

In some embodiments, system administrators who want to configure peering between network routers to allow those routers to exchange route information (e.g., via border gateway protocol (BGP), open shortest path first, interior gateway protocol, exterior gateway protocol, routing information protocol, etc.) must configure each router to explicitly peer with a second router. Configuring peering sessions (e.g., BGP sessions) between devices (e.g., routers or layer 3 switches) in a network involves an administrator determining the internet protocol (IP) address of each device, or assigning an address to devices, and using those addresses to configure peering. For example, an administrator may enter the command line interface of a device and enter commands that configure the device to start a peering session (e.g., a BGP peering session) with the other device.

Addition of a new route peer requires allocation and assignment of an IP address to that device and configuring the device and its peers to peer using this IP address. This constant allocation, assignment and configuration of devices, all while tracking the IP addresses assigned to the various devices, is a tedious and cumbersome process. Furthermore, configurations are not portable (i.e., cannot be reused) on multiple devices as each configuration becomes specific to the device it is created on by virtue of its peers' IP addresses. Thus, an administrator cannot reuse known good configurations and is instead required to reconfigure new and replacement devices. This process allows configuration errors to creep into the system at each configuration of a route peer.

Accordingly, an improved solution for configuring route peers without requiring tracking and configuration of interface IP addresses is desirable. Among the benefits of the disclosure herein are creating a method of configuring one or more interfaces in a device without knowing the IP address assigned to the interface or knowing the IP addresses assigned to peers that are communicating on the interface. By removing these constraints, the configuration of the device is portable (i.e., can be used on other devices that exists with the same network topology definition) and the configuration does not require the arduous tasks of tracking route peer IP addresses. This solution, detailed in embodiments below, improves the efficiency of provisioning network routing peers at a network device by allowing administrators to reuse known good configurations for route peers and allows configurations to be simplified by having the router determine the IP addresses of its route peers rather than requiring that administrators track and configure that information.

Systems and methods are described herein for automatically detecting network routing peers and establishing route peering sessions. In some embodiments, a network device, e.g., a layer 3 switch or a router, is implemented to receive configuration data that identifies an interface (e.g., a physical port) for route peering. The network device configures the interface (e.g., a port) with a local-network address (e.g., an IPv6 link local address) and uses that local-network address (e.g., interface address) to establish a route peering session with a second device. The network device monitors the interface, based on the configuration of the interface, to detect a routing peer (e.g., listening for a router advertisement message that is received on the interface). In some embodiments, the network device extracts the address (e.g., an IPv6 link local address of the peering device) from a received router advertisement and opens a route peering session with the peering device using the extracted address (e.g., starts a BGP session). By using IPv6 link-local addresses, the network device and interface can get an address automatically assigned without an administrator tracking which address is assigned and use the router peer's address, learned via a router advertisement (e.g., IPv6 Router Advertisement) message to establish a route peering session (e.g., BGP session). This greatly reduces the provisioning and maintenance burden for network administrators.

Other aspects will be apparent from the following description and the claims.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Specific embodiments will now be described in detail with reference to the accompanying figures. In the following detailed description of these embodiments, numerous specific details are set forth in order to provide a more thorough understanding of the disclosure. However, it will be apparent to one of ordinary skill in the art and having the benefit of this disclosure that embodiments may be practiced without some or all of these specific details. In other instances, well-known features have not been described in detail to avoid unnecessarily complicating the description.

In general, the following embodiments relate to automatically configuring interfaces of a network device to initiate a route peering session with a route peer. More particularly, the disclosure relates to receiving a configuration that is portable in that the configuration need not specify the IP address of the route peer.

Figure 1:
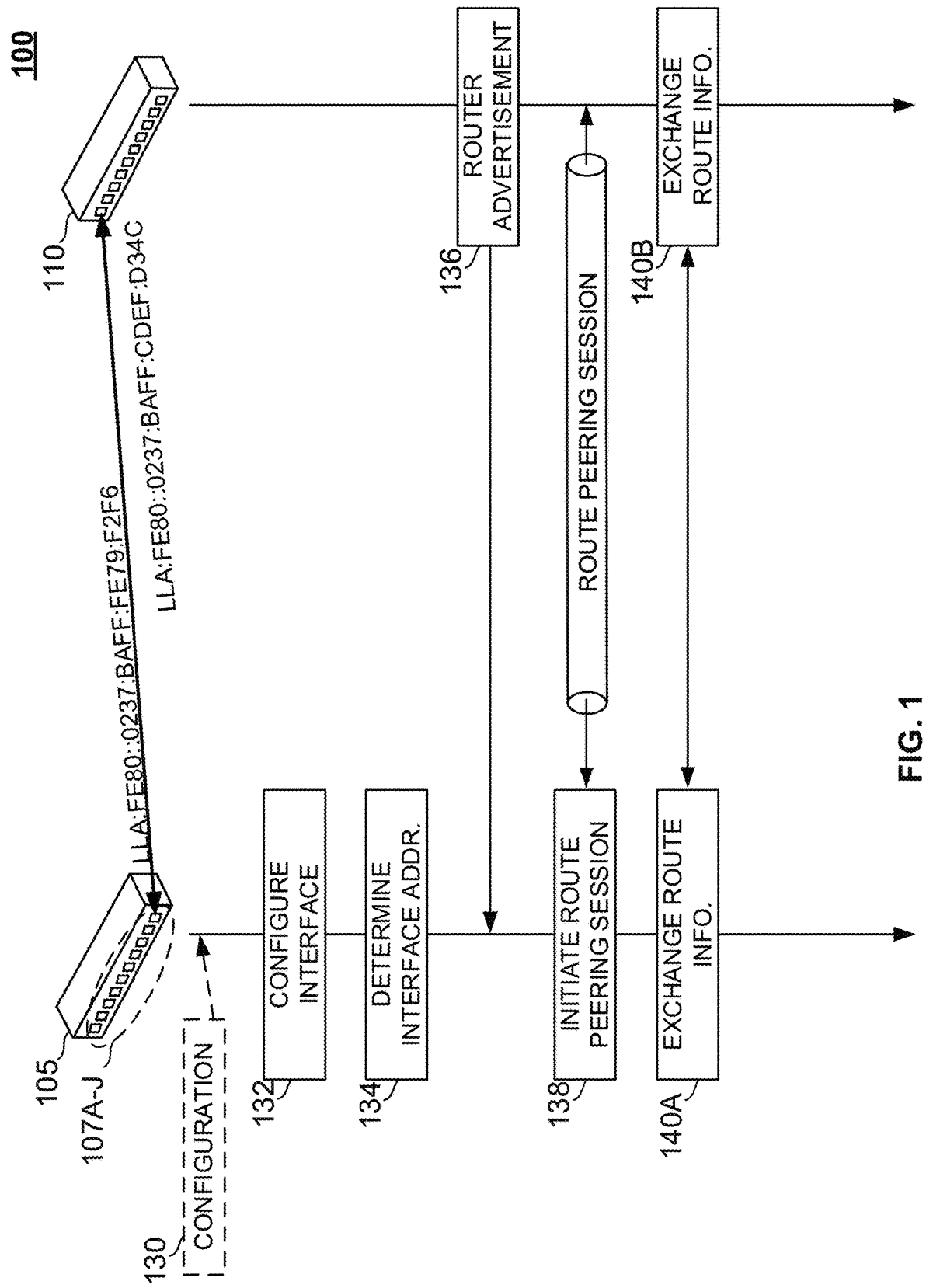
FIG. 1 illustrates one example of the messaging and configuration between network devices during the automatic detection of network routing peers and establishment of a route peering session, in accordance with some embodiments of the disclosure.

FIG. 1 shows a network topology 100 in accordance with one or more embodiments of the disclosure. Network topology 100 includes a network device 105 (e.g., a layer 3 switch or a router) that contains several interfaces 107A-J (e.g., Ethernet interfaces). It should be noted that, while FIG. 1 shows that network device 105 has 10 interfaces 107A-J, this is merely illustrative and those skilled in the art will recognize that network device 105 may have any number of interfaces 107. As shown in FIG. 1, a given interface 107J is operatively connected to an interface of a second network device 110.

In some embodiments, network device 105 receives configuration 130. For example, an administrator may apply a configuration to network device 105 such as "neighbor interface Ethernet1-10 peer-group pg1 remote-as 1" which instructs the network device to use ethernet interfaces 1-10 as a part of peer group "pg1" to peer with a remote autonomous system "1". Network device 105 applies this configuration, e.g., at step 132, on its interfaces 107A-J. For example, network device 105 may set a series of flags in memory that indicate that certain route peering protocols (e.g., BGP) will be enabled on the specified interfaces. In some embodiments, network device 105 determines interface addresses for each interface at step 134. For example, as depicted in FIG. 1, interface 107J is configured with a link-local address of FE80::0237:BAFF:FE79:F2F6. As described, this address may be derived from the media access control (MAC) address or be specified in a configuration.

At step 136, peer network device 110 sends a router advertisement (e.g., an IPv6 router advertisement or an IPv6 neighbor advertisement as disclosed in RFC 4861) that identifies the address of the interface sending the router advertisement. For example, in FIG. 1 the first interface of network device 110 is assigned or configured with an address (e.g., link-local address) of FE80::0237:BAFF:CDEF:D34C. After receiving the router advertisement, network device 105 can extract an address for network device 110 from router advertisement (e.g., link-local address FE80::0237:BAFF:CDEF:D34C) and use that address to initiate a route peering session at step 138. For example, network device 105 may transmit a session open message (e.g., a BGP Open Message) from interface 107J to network device 110 at address FE80::0237:BAFF:CDEF:D34C.

At step 140A, network device 105 may transmit route information to network device 110 via the route peering session established at step 138. And at step 140B, network device 110 may transmit route information to network device 105. For example, network devices 105 and 110 may utilize BGP route update messaging to exchange network layer reachability information (NLRI), autonomous system paths, autonomous system path attributes, or other information received. One of skill in the art would understand that protocols other than BGP may be used based on the particular routing protocol enabled on the interface.

As such, this configuration is portable as the configuration is not specific to a single device that is communicating with a route peer having a specifically configured IPv6 address. In some embodiments, an IPv6 link-local address for an interface is used (e.g., a link-local address is automatically assigned by a Linux kernel). In some embodiments, a router advertisement messaging protocol (e.g., IPv6 router advertisement protocol) is used to learn a link-local address of a peer router (e.g., an IPv6 link-local addresses of an interface on a peer router). The network device may cache the addresses of its peer routers and use those addresses to establish route peering sessions (e.g., BGP sessions over the transmission control protocol). Thus, the network device automatically enables and initiates route peering (e.g., BGP peering) over an IP link (e.g., using IPv6 link-local addresses) between route peers without configuring the network device to know the address or range of potential addresses. This allows system administrators to more easily configure route peering (e.g., BGP peering) specifying an interface or a range of interfaces to be used for session establishment instead of using specific peer addresses. It also allows the administrator to assign these interfaces to peer-groups through which common peering configurations can be shared. Administrators can, therefore, share configurations (e.g., known good configurations) across devices and thereby alleviate the burden of maintaining distinct configuration files.

Figure 2:
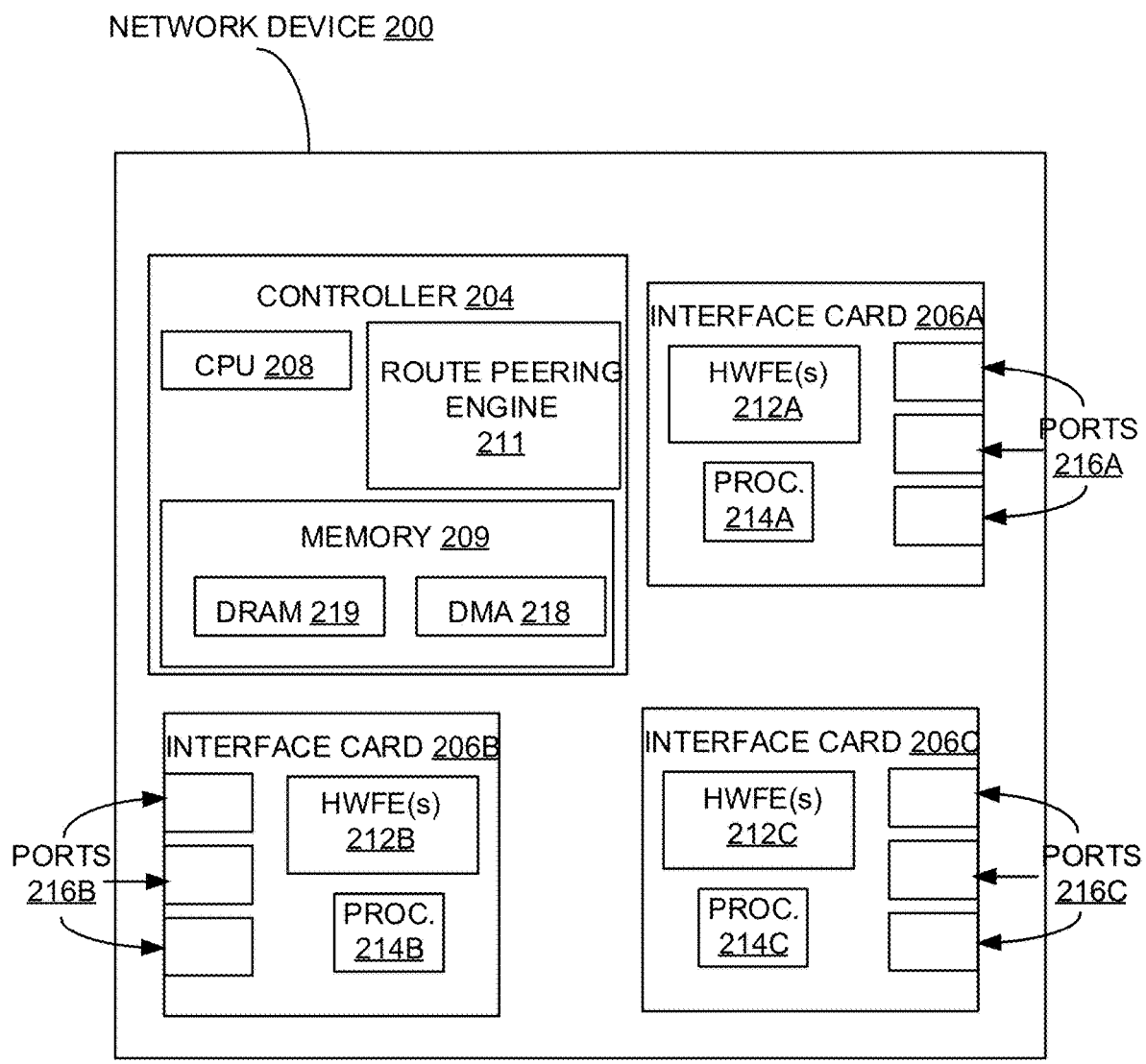
FIG. 2 illustrates one example of a network device that includes an exemplary route peering engine used to automatically detect network routing peers and establish a route peering session, in accordance with some embodiments of the disclosure.

FIG. 2 is a block diagram of a network device 200 that includes an exemplary route peering engine used to automatically detect network routing peers and establish route peering session(s), in accordance with some embodiments of the disclosure. For example, network device 105 and/or network device 110 may be implemented with some or all of the components of network device 200. While FIG. 2 illustrates various components of network device 200, it is not intended to represent any particular architecture or manner of interconnecting the components, as such details are not germane to the present disclosure. In the example shown in FIG. 2, network device 200 includes a controller 204 comprising a central processing unit (CPU) 208, a memory 209, and a route peering engine 211. Memory 209 may include a direct memory access (DMA) controller 218 and dynamic random access memory (DRAM) 219. Memory 209 may further include one or more mass storage devices (not shown in FIG. 2), such as hard drives, optical drives, flash memory, and/or other types of memory systems that maintain data even after power is removed from the system. In some embodiments, CPU 208 is used to process information for controller 204. In particular, CPU 208 writes configuration data for the hardware forwarding engines (HWFE) 212A-C (described below), and reads data HWFE 212A-C. In one embodiment, DRAM 219 is memory that is used to store data for controller 204. In addition, DRAM 219 may be shared with coprocessors 214A-C of interface cards 206A-C (described below), because coprocessors 214A-C can access the contents of this memory. In one embodiment, DRAM 219 includes route peering parameters used by the route peering engine 211 and is associated with DMA controller 218. In other embodiments, DMA controller 218 is not part of memory 209, and is instead part of interface cards 206A-C, and is coupled to DRAM 219.

Network device 200 further includes a plurality of interface cards 206A-C that can each receive, process, and/or forward network traffic. For example, in the embodiment shown in FIG. 2, network device 200 includes three interface cards 206A-C, but this is merely illustrative and those skilled in the art will recognize that network device 200 may include any number of interface cards 206. Each interface card 206 comprises at least one HWFE 212 and coprocessor 214, along with one or more ports (e.g., Ethernet ports) 216. Ports 216 may be of the same or different types (e.g., Ethernet copper interface, Ethernet fiber interfaces, wireless, and/or other types of network interfaces). Interface cards 206A-C may be coupled to each other and/or to controller 204 via one or more busses (not shown in FIG. 2), and the busses may be connected to each other through various bridges, controllers, and/or adapters, as is well known in the art.

Network device 200 may further include a display controller, a display device, an input/output (I/O) controller, and/or peripheral devices such as I/O devices such as mice, keyboards, and/or other I/O devices known in the art (none of which are shown in FIG. 2).

In one embodiment, HWFE 212 is a component that forwards data for the network element (e.g., routing, switching, or another type of network forwarding). In one embodiment, coprocessor 214 is a processor for each interface card 206 that can be used to accelerate various functions of the interface card 206. For example, and in one embodiment, coprocessor 214 can communicate with route peering engine 211 in controller 204 to obtain route peering parameters and configure ports 216. In one embodiment, there is one coprocessor 214 for one or more HWFE 212. For example, and in one embodiment, there is one coprocessor 214 for three HWFEs 212. In an alternative embodiment, each coprocessor 214 is associated with a single HWFE 212. In a further embodiment, HWFE 212 could be implemented in software or a combination of software and hardware. For example, and in one embodiment, HWFE 212 could be doing the forwarding in software in some sort of programmable processor or network processor on the linecard, where the tables, memories, or data structures that are used by that HWFE 212 are written to by the coprocessor 212. In one embodiment, ports 216A-C are used to receive and transmit network traffic. Ports 216A-C can be the same or different physical media (e.g., copper, optical, wireless and/or another physical media).

In some embodiments, the interface cards 206 receives and processes network data using various configuration data (e.g., forwarding, security, quality of service (QoS), and other network traffic processing information). For example, for each received packet of the network traffic, HWFE 212, in combination with coprocessor 214, determines a destination address of that packet, looks up the requisite information for that destination in one or more tables stored in HWFE 212 or in memory associated with the interface card 206 (not expressly shown in FIG. 2), and forwards the packet out the proper outgoing interface.

In one embodiment, the complex of HWFE 212 and the associated coprocessor 214 is one interface card 206 for the purposes of this invention. There may be multiple ports on an interface card 206, or just one. The interface cards 206A-C may all be connected to the CPU 208 using one physical connection (e.g., a peripheral component interconnect (PCI) bus or other physical connection) or multiple connections used to access DRAM 219 in controller 204. In this embodiment, the same design applies even if there are no linecards and even if there is a single coprocessor 214 and HWFE 212. In a fixed system with no linecards, it is possible that there is still a coprocessor 214 that does this. In another embodiment, the coprocessor 214 associated with an interface card may reside in the main CPU 208 and be a separate thread of the same CPU 208 or of another CPU (not shown in FIG. 2) in the system that is associated with one or more HWFE 212. In a further embodiment, the coprocessor 214 need not reside on the same linecard as the HWFE 212. In this embodiment, the coprocessor 214 has access to main memory (e.g., DMA controller 218) and the coprocessor 214 has the ability to write to (and possibly read from) the associated HWFE 212. The coprocessor 214 can reside on a different linecard, or it could be dedicated coprocessor hardware on the main supervisor/controller card, or a thread of the main CPU 208. In another embodiment, the coprocessor 214 may reside physically inside HWFE 212 and be a component of HWFE 212.

In one embodiment, interface cards 206A-C and controller 204, either individually or collectively, comprise control circuitry. Control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry executes instructions for an application stored in memory (e.g., storage). Specifically, control circuitry may be instructed by the application to perform the functions discussed above and below. In some implementations, any action performed by control circuitry may be based on instructions received from an application or from non-transitory computer readable medium (e.g., CD-ROM, DVD, hard disk).

In one embodiment, controller 204 gathers the configuration data for HWFE 212A-C from different sources (e.g., locally stored configuration data, via a command line interface, or other management channel (e.g., simple network management protocol (SNMP), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to HWFE 212A-C and ports 216A-C via, in part, route peering engine 211.

Figure 3:
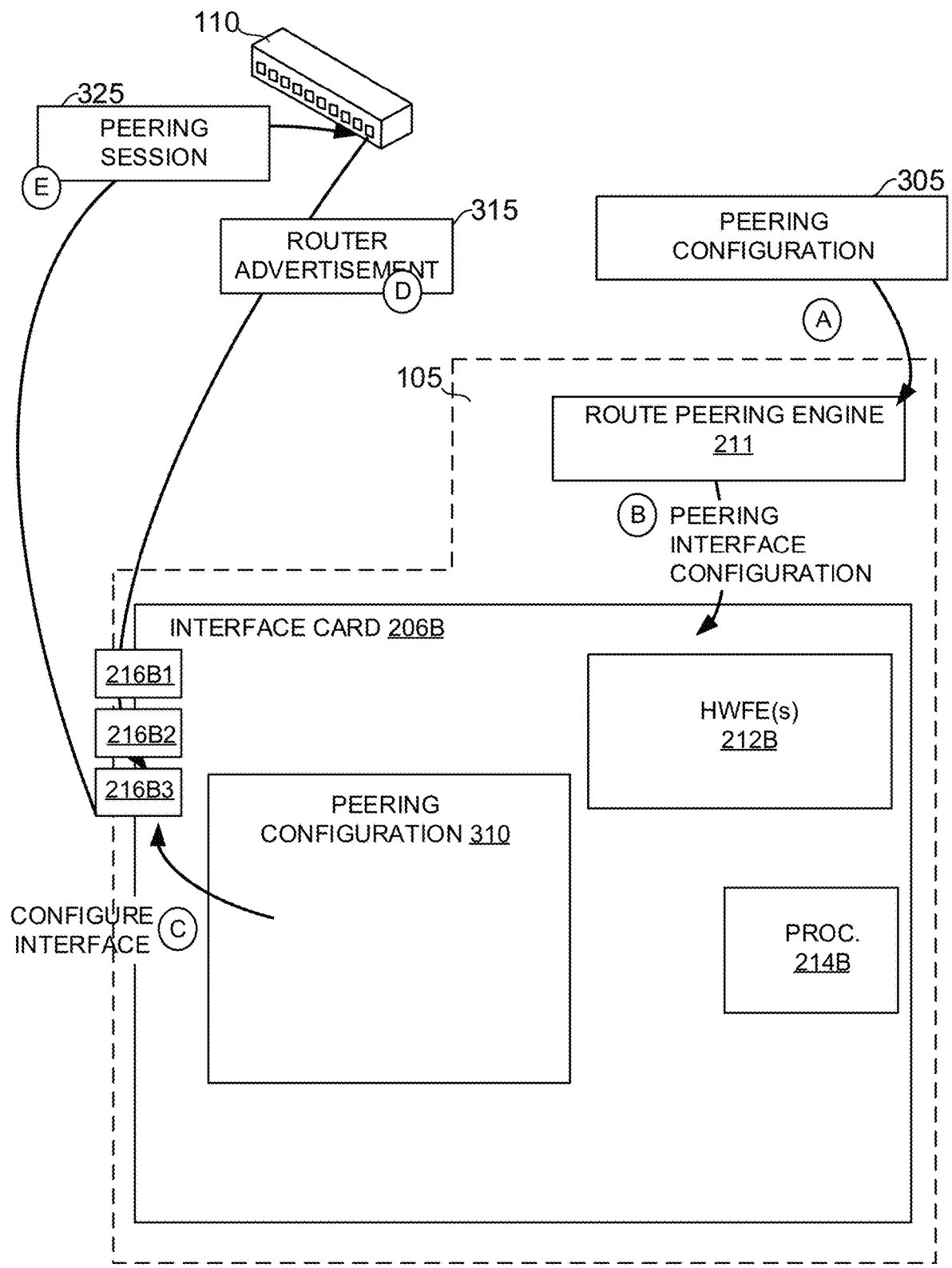
FIG. 3 illustrates operations that occur at an exemplary network device, using a route peering engine, to automatically detect network routing peers and establish a route peering session, in accordance with some embodiments of the disclosure.

FIG. 3 illustrates operations that occur at an exemplary network device, using a route peering engine, to automatically detect network routing peers and establish route peering session, in accordance with some embodiments of the disclosure. In particular, FIG. 3 illustrates route peering engine 211 of FIG. 2 and interface card 206B of FIG. 2. Route peering engine 211 receives peering configuration 305 at time point A. In some embodiments, peering configuration may be included in a configuration file (e.g., XML, JSON, CSV, or other appropriate format) that is transmitted to the network device (e.g., network device 105) from a central configuration server. In some embodiments, an administrator may log into the network device (e.g., network device 105) and provide commands (e.g., via a command line interface or web graphical user interface) to provide the configuration information.

Route peering engine 211 may inspect peering configuration 305 and determine which interface cards (e.g., interface card 206B) require information from the configuration. For example, in FIG. 3, route peering engine 211 sends peering interface configuration to interface card 216B at step B. Using the peering interface configuration, the interface card 206B may configure its interfaces, e.g., interface 216B3, with peering configuration 310 at step C. For example, interface card 206B may open ports necessary for route peering, enable packet monitoring to listen for packets on certain ports and/or of certain types (e.g., BGP messaging packets), and/or establish route peering sessions based on the peering configuration.

At timepoint D, network device 105 receives a router advertisement 315, as described with reference to FIG. 1, from network device 110. Interface card 206B, or the controller of network device 105 (e.g., controller 204) may then inspect the router advertisement 315 to determine the address (e.g., IPv4 address or IPv6 address) of network device 110. Using the determined address of peer network device 110, network device 105 may establish a peering session 325 between itself and peer network device 110 via interface 216B3 (e.g., open a BGP session). With the peering session open, network devices 105 and 110 may exchange routing information (e.g., exchange BGP Update messages).

Figure 4:
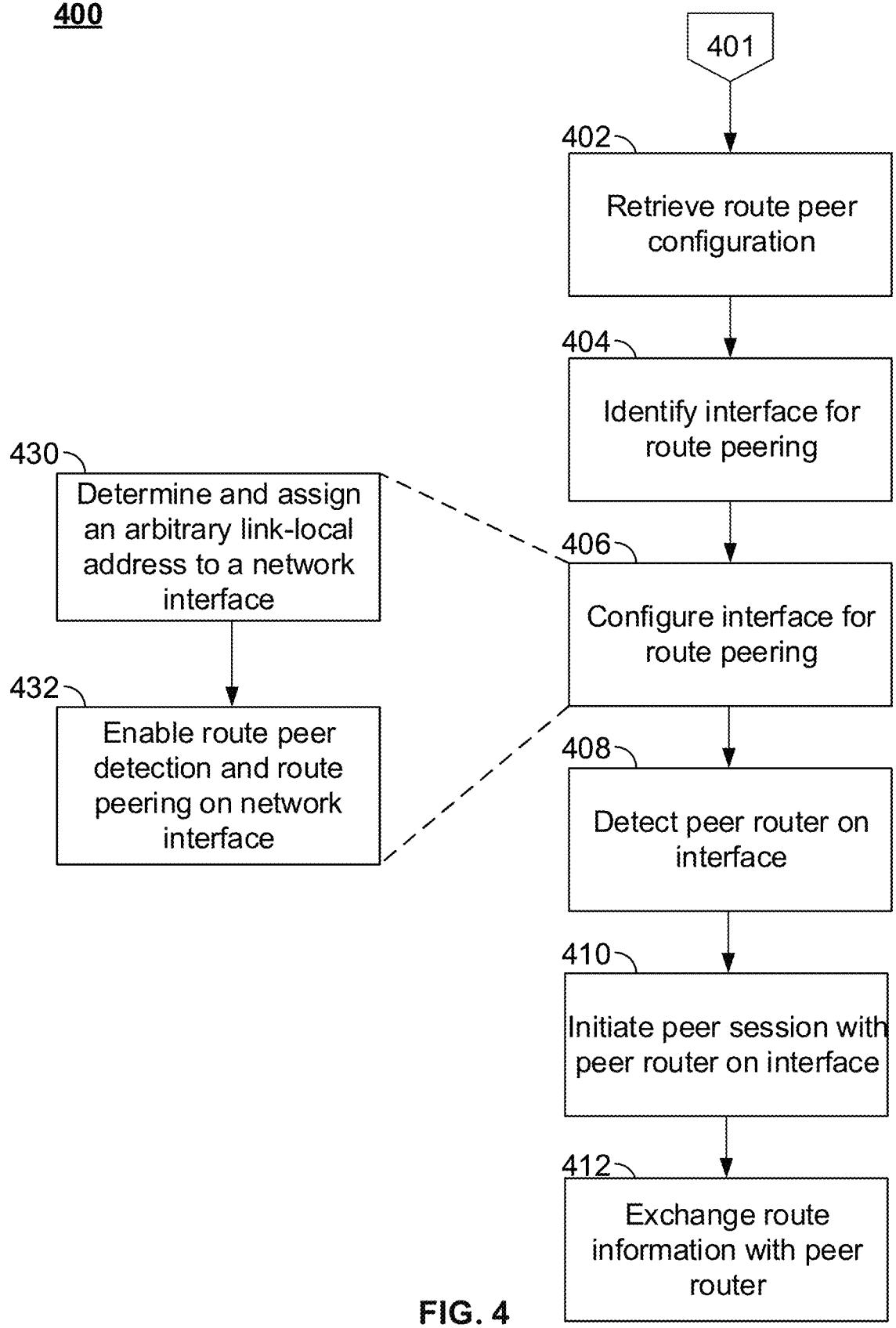
FIG. 4 is a flowchart of a detailed illustrative process for automatically detecting network routing peers and establishing route peering sessions, in accordance with some embodiments of the disclosure.

FIG. 4 is a flowchart of a detailed illustrative process for automatically detecting network routing peers and establishing route peering sessions, in accordance with some embodiments of the disclosure. Process 400 begins at step 401. At step 402, control circuitry in a network device retrieves route peer configuration for the network router. For example, the network device may communicate with a configuration server, e.g., a controller, that contains configuration data for the network device including route peer configuration information. In some embodiments, a network administrator may upload a configuration file (e.g., a JSON, XML, CSV, or other suitable format) into the network device that contains route peer configuration. In some embodiments, a network administrator may log in to a command line interface or web-based graphical user interface and provide configuration information that is saved in a datastore (e.g., persistent storage such as in a file of a file system or in non-persistent storage such as a memory). The route peer configuration contains information sufficient to inform the network device which interfaces (e.g., ports) will participate in route peering and will typically include information identifying the interfaces within a peer group and identify the autonomous systems (e.g., AS ID) in which each interface participates. A sample of the configuration may include the following:

neighbor interface Ethernet1-10 peer-group pg1 remote-as 1 neighbor interface Ethernet11-15 peer-group pg2 remote-as 12.

This configuration designates ethernet interfaces with IDs 1-10 for route peering in peer-group "pg1" and coupled to remote autonomous system 1 and also designates ethernet interfaces with IDs 11-15 for route peering in peer-group "pg2" and couple to remote autonomous system 12. Notably, the configuration is not dependent on knowing the addresses of either the interfaces of the network devices (as the interfaces are identified using interface ID) or the addresses of the routing peers. Thus, the same configuration can be applied to two network devices that are each using the same interfaces for the same peer-groups and remote autonomous systems. In other words, a known good configuration is made portable when used in a network device according to the methods and systems described herein.

At step 404, the control circuitry identifies, based on the route peer configuration, a network interface from a plurality of network interfaces of the network router for route peering. Using the example configuration above, the control circuitry may identify that ethernet interface with an ID 1 should be configured for route peering in peer-group "pg1" for remote-as "1" based on the line "neighbor interface Ethernet1-10 peer-group pg1 remote-as 1".

At step 406, the control circuitry configures the network interface (identified at step 404) to participate in route peering. In one example, the configuration of the network interface is accomplished according to steps 430-432. If, for example, the network interface has not been configured with a link-local address, the control circuitry may assign an interface address to the network interface, in this case a link-local address. At step 430, the control circuitry determines and assigns an arbitrary link-local address to the network interface. For example, the control circuitry may determine an interface identifier, such as a MAC address of the network interface, and assign to the network interface a link local address derived from the MAC address of the network interface.

In an illustrative embodiment, the control circuitry may determine that the MAC address of "0237:BAFF:FE79:F2F6" was assigned to the network interface. The control circuitry may then derive the network interface address from the MAC address. In some embodiments, the control circuitry may further assign a link-local prefix to the network interface (e.g., following the IPv6 protocol, the link-local prefix may be "FE80"). The control circuitry may then combine the prefix and the interface identifier to generate the network interface address. For example, the control circuitry uses the link-local prefix "FE80" in the high order byte followed by all 0 bytes in a 64-byte address with the interface identifier and uses the interface identifier of "0237:BAFF:FE79:F2F6" in the low order bytes to generate the interface address (according to an IPv6 format) of "FE80:0:0:0:0:0:0:0:0:0:0:0:0:0: 0237:BAFF:FE79:F2F6" which can be represented as "FE80:: 0237:BAFF:FE79:F2F6." The control circuitry then assigns the generated address of "FE80:: 0237:BAFF:FE79:F2F6" to the network interface (e.g., ethernet interface 1). Those skilled in the art will appreciate that this example is merely illustrative, and that other addressing schemes may be used for determining and assigning link-local addresses to network interfaces without departing from the scope of this disclosure.

At step 432, the control circuitry enables route peer detection and route peering on the network interface. For example, the control circuitry may instruct a route peering engine to begin monitoring traffic on the interface for router advertisements (e.g., IPv6 neighbor discovery messages) and route peer update messages (e.g., BGP Open or BGP Update messages).

With the network interface properly configured for route peering, process 400 continues at step 408 where the control circuitry detects a peer router on the network interface. For example, the interface receives a router advertisement message or a neighbor advertisement message (e.g., an IPv6 neighbor discovery message). In some embodiments, the network device transmits a solicitation message (e.g., an IPv6 neighbor discovery solicitation message according to RFC 4861) requesting that peer routers identify themselves with a responsive advertisement message.

At step 410, the control circuitry initiates a peering session on the network interface with the peer router. In some embodiments, the control circuitry may extract a peer address (e.g., an IPv6 address) for the peer router from a router advertisement. For example, if the interface receives an IPv6 solicitation message that includes a source address which identifies an address assigned to the peer router's interface. The network device may use the extracted peer address to open a peering session (e.g., send BGP Open message to the peer router). Using the peering session, the control circuitry may exchange route information with the peer router (e.g., sending a BGP Update message with route information to the peer route).

Portions of what was described above may be implemented with logic circuitry such as a dedicated logic circuit or with a microcontroller or other form of processing core that executes program code instructions. Thus, processes taught by the description above may be performed with program code, such as machine-executable instructions that cause a machine that executes these instructions to perform certain functions. In this context, a "machine" may be a machine that converts intermediate-form instructions into processor-specific instructions (e.g., an abstract execution environment such as a "process virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions, such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code with configures control circuitry to perform the various functions described above. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, the present disclosure is not described with reference to any particular programming language. It will be appreciated that a variety of programming languages may be used to implement the teachings of the disclosure as described herein.

The foregoing discussion merely describes some exemplary embodiments. One skilled in the art will readily recognize from such description, the accompanying drawings, and the claims, that various modifications may be made without departing from the spirit and scope of the disclosure.

What is claimed is:

1. A method for automatically detecting network routing peers and establishing route peering sessions, the method comprising:
   retrieving, at a network router, route peer configuration for the network router, wherein the route peer configuration comprises a first identifier that specifies one or more network interfaces for route peering;
   identifying, based on the first identifier in the route peer configuration, a network interface from a plurality of network interfaces of the network router for route peering;
   configuring the network interface to participate in route peering, including determining a second identifier different from the first identifier and assigning the second identifier to the network interface;
   detecting a peer router on the network interface;
   initiating a peering session on the network interface with the peer router; and
   exchanging, using the peering session, route information with the peer router.

2. The method of claim 1, wherein determining the second identifier comprises:
   determining a media access control address for the network interface;
   generating an interface address derived from the media access control address; and
   assigning the interface address to the network interface.

3. The method of claim 2, wherein the interface address is an internet protocol version 6 (IPv6) formatted address.

4. The method of claim 1, wherein configuring the network interface to participate in route peering further comprises:
   enabling route peer detection on the network interface; and
   enabling route peering sessions on the network interface.

5. The method of claim 1, wherein detecting the peer router on the network interface comprises:
   receiving, from the peer router, a router advertising message; and
   extracting, from the router advertising message, a peer address for the peer router.

6. The method of claim 1, wherein the route peer configuration does not identify an address for the peer router.

7. The method of claim 1, wherein the route peer configuration does not identify the peer router.

8. The method of claim 1, wherein the peering session is a border gateway protocol (BGP) session.

9. A system for automatically detecting network routing peers and establishing route peering sessions, the system comprising:
   a network interface configured to communicate with network interfaces in other systems; and
   control circuitry configured to:
      retrieve route peer configuration for the network interface, wherein the route peer configuration comprises a first identifier that specifies one or more network interfaces for route peering;
      identify, based on the first identifier in the route peer configuration, the network interface for route peering;
      configure the network interface to participate in route peering, including determining a second identifier different from the first identifier and assigning the second identifier to the network interface;
      detect a peer router on the network interface;
      initiate a peering session on the network interface with the peer router; and
      exchange, using the peering session, route information with the peer router.

10. The system of claim 9, wherein determining the second identifier includes:
    determining a media access control address for the network interface;
    generating an interface address derived from the media access control address; and
    assigning the interface address to the network interface.

11. The system of claim 10, wherein the interface address is an internet protocol version 6 formatted address.

12. The system of claim 9, wherein the control circuitry configures the network interface to participate in route peering by:
    enabling route peer detection on the network interface; and
    enabling route peering sessions on the network interface.

13. The system of claim 9, wherein the control circuitry detects the peer router on the network interface by:
    receiving, from the peer router, a router advertising message; and extracting, from the router advertising message, a peer address for the peer router.

14. The system of claim 9, wherein the route peer configuration does not identify an address for the peer router.

15. The system of claim 9, wherein the route peer configuration does not identify the peer router.

16. The system of claim 9, wherein the peering session is a border gateway protocol (BGP) session.

17. A non-transitory computer readable medium having instructions encoded thereon that when executed by control circuitry cause the control circuitry to:
    retrieve, at a network router, route peer configuration for the network router, wherein the route peer configuration comprises a first identifier that specifies one or more network interfaces for route peering;
    identify, based on the first identifier in the route peer configuration, a network interface from a plurality of network interfaces of the network router for route peering;
    configure the network interface to participate in route peering, including determining a second identifier different fro the first identifier and assigning the second identifier to the network interface;
    detect a peer router on the network interface;
    initiate a peering session on the network interface with the peer router; and
    exchange, using the peering session, route information with the peer router.

18. The non-transitory computer readable medium of claim 17, wherein the instructions further cause the control circuitry to:
    enable route peer detection on the network interface; and
    enable route peering sessions on the network interface.

19. The non-transitory computer readable medium of claim 17, wherein the instructions further cause the control circuitry to:
    receive, from the peer router, a router advertising message; and
    extract, from the router advertising message, a peer address for the peer router.

20. The non-transitory computer readable medium of claim 17, wherein the route peer configuration does not identify an address for the peer router.

* * * * *